United States Patent Office 3,256,113
Patented June 14, 1966

3,256,113
ANTISTATIC TREATMENT OF BISCARBALLYL-
OXY ESTER COPOLYMERS
William R. Dial, Akron, Ohio, assignor to Pittsburgh
Plate Glass Company, Pittsburgh, Pa., a corporation of
Pennsylvania
No Drawing. Filed Feb. 13, 1962, Ser. No. 172,869
5 Claims. (Cl. 117—118)

This invention relates to an improved method for preventing the accumulation of electrostatic charges on thermosetting resins. It relates in particular to a method of reducing the tendency to accumulate electrostatic charge on biscarballyloxy ester copolymers such as poly bis(allyl carbonate) ester copolymers, notably poly diethylene glycol bis(allyl carbonate)-maleic anhydride.

It is well-known that articles manufactured from synthetic resins have a tendency to accumulate electrostatic charge. Certain synthetic resins manifest this tendency to a degree much greater than others. This electrostatic charge accumulation leads to disagreeable electric shock, ignition of inflammable solvents, accumulation of dust on molds used in shaping articles of resins and many other objectionable and even dangerous consequences.

The prior art has advanced ways of reducing this tendency of material made from synthetic resins to accumulate electrostatic charge. These include spraying the material with hygroscopic substances or electrically conducting substances; blending partially electrically conducting materials with the resin stock from which the article is formed, incorporating partially electrically conducting substances in monomers or monomer mixtures before the polymeric material is formed; and a variety of other proposals. No completely satisfactory method of eliminating or reducing the objectionable accumulation of electrostatic charge has been discovered.

It has now been found that the objectionable accumulation of electrostatic charges on certain resins may be reduced or entirely eliminated by building into the molecule a partially conducting group. Thus, copolymers of bisallyl carbonates with unsaturated dibasic acid anhydrides are treated to convert the dibasic anhydride units on the resin surface, at least partially to conducting fragments. Thus the tendency of the copolymer to accumulate electrostatic charges is reduced and the treated resin is rendered substantially antistatic.

In accordance with this invention copolymers of bisallyl carbonates with unsaturated dibasic acid anhydrides, notably diethylene glycol bis(allyl carbonate)-maleic anhydride copolymers are treated to convert a portion of the dibasic acid anhydride units on the resin surface to electrically conducting groups, notably salt and carboxylic acid groups. Thus in this invention the resin is contacted with hot aqueous media to cause hydrolysis of the dibasic acid anhydride units on the resin surface. This is advantageously achieved by employing hot aqueous media at a temperature of at least 80° C. and preferably in the range of 95 to 105° C. Still higher temperatures may be employed if contact of the resin with hot aqueous media is achieved under pressure. However, treatment temperatures must be employed which are below the temperature at which the resin is subject to heat distortion. Thus, under pressure hot aqueous media are preferably employed at temperatures below 120° C. Treatment with hot aqueous media containing basic substances to cause hydrolysis of the dibasic acid anhydride groups on the resin surface results in salt formation.

Copolymers as employed in this invention are obtained by mixing biscarballyloxy substituted monomers especially bisallyl carbonoates with from 1 to 20 percent by weight of unsaturated dibasic acid anhydrides, followed by polymerization of the mixture by known means, viz., the addition of a free radical catalyst. In general, from 0.001 to 5.0 parts of free radical catalyst per 100 parts of monomeric mixture is added to the mixure of monomers. The free radical catalyst is generally selected from the known peroxides and percarbonates. However, other substances for inducing polymerization may be employed. The amount of such catalyst depends upon the particular catalyst, the mixture of monomers selected, the reaction temperature, and the time in which polymerization is desired to be achieved. Since bisallyl carbonates can enter into the polymerization at both allyl groups, the resulting products are crosslinked and of the thermosetting type useful in the preparation of cast resin objects, viz., sheets, rods, tubes and the like. Obviously, regularly shaped as well as irregularly shaped castings may be subjected to the treatment of this invention. A typical polymerization procedure results when three parts of diisopropyl peroxydicarbonate is employed per 80 parts by weight of diethylene glycol bis(allyl carbonate) and 20 parts by weight of maleic anhydride. Polymerization is usually completed in less than 24 hours by heating the monomer-catalyst mixture at approximately 45° C. However, longer or shorter times may be preferred for specific monomer resin mixtures. Imparting antistatic properties to the copolymer, in accordance herewith is achieved by contacting with hot aqueous media which results in attack on the dibasic acid anhydride groups on the resin surface. Water at 95 to 105° C. in the liquid phase produces sufficient attack on the resin surface in a period of 2.5 hours to render the resin antistatic. Addition of basic substances to the aqueous medium causes sufficient attack in shorter periods of time, such that a 25 percent by weight aqueous solution of dimethylaminoethanol will render copolymers of diethylene glycol bis(allyl carbonate) and maleic anhydride in 15 minutes at 95 to 100° C. Lower temperatures require longer time, such that it is desired to employ temperatures above 80° C. to obtain the desired effect in a reasonable length of time. Other suitable basic media may be formed by substitution of various inorganic and organic bases. It is preferred that relatively non-volatile organic bases, such as dimethylaminoethanol, be employed. Contact with the hot aqueous medium may be readily achieved by preparing a liquid reservoir of the hot aqueous medium of sufficient size to permit immersion of the resin therein. Alternative methods of contact obvious to those skilled in the art may be employed without departing from the invention.

In one embodiment of the invention diethylene glycol bis(allyl carbonate)-maleic anhydride copolymers containing from 1 to 20 percent by weight of maleic anhydride are contacted with hot water at 95 to 105° C. for a period of 2.5 hours under normal pressure to render the surface thereof partially electrically conducting. In another embodiment of the invention diethylene glycol bis(allyl carbonate)-maleic anhydride is treated by contacting with a hot solution of aqueous dimethylaminoethanol for a period of time to render the resin partially electrically conducting.

EXAMPLE I

Diethylene glycol bis(allyl carbonate) is mixed in the proportion of 80 parts by weight of diethylene glycol bis(allyl carbonate) with 20 parts by weight of maleic anhydride and stirred until the solution is complete. Per 100 parts of this mixture, three parts of diisopropyl peroxydicarbonate is added and stirred until dissolved, after which the mixture is placed in a number of test tubes, 2 x 15 centimeters, each filled approximately one-half full. The test tubes are then placed in a water bath for 48 hours at 45° C. A post polymerization treatment of three hours at 90° C. in an oven is employed to insure complete polymerization. The cooled castings are conveniently removed from the tubes by chilling in an acetone-Dry Ice bath.

The castings prepared as above are divided into groups such that two are set aside for use as untreated control samples, two additional castings are treated by contacting with water at 98° C. for a period of 2.5 hours, and two other castings are treated by immersion in 25 percent by weight aqueous dimethylaminoethanol at its normal boiling point for a period of 15 minutes.

Each of the test tube castings thus prepared and treated, is rubber with a piece of white wool cloth for two minutes to charge electrically. Each casting in succession is held at a height of one-fourth inch above freshly prepared cigarette ashes. It is observed that only the castings which are untreated attract the ashes.

EXAMPLE II

A series of diethylene glycol bis(allyl carbonate)-maleic anhydride resins are prepared as in Example I to give 5, 10, 15, and 20 percent maleic anhydride by weight in the resulting castings. The castings obtained are divided into groups as in Example I. Group I is treated with 25 percent by weight aqueous dimethylaminoethanol at its normal boiling point for 15 minutes. Group II is untreated. These samples are rubbed with wool cloth to charge electrically. It is observed that those containing more than 10 percent maleic anhydride by weight cannot be made to accumulate an electrostatic charge. Those containing 5 percent maleic anhydride by weight are observed to acquire a weak fugitive electrostatic charge when tested by the cigarette ash test as in Example I.

EXAMPLE III

In place of diethylene glycol bis(allyl carbonate) 20 percent by weight of ethylene glycol bis(allyl carbonate) may be substituted with results similar to those obtained in Example I.

EXAMPLE IV

Citraconic anhydride is substituted for maleic anhydride and tested as in Example I. Those samples treated with 25 percent by weight of aqueous dimethylaminoethanol for 15 minutes at its normal boiling point are antistatic in the cigarette ash test given in Example I, to a greater degree than those treated with water at its normal boiling point.

Anhydrides which may be used in the present invention are the unsaturated dibasic acid anhydride homologues of maleic anhydride and unsaturated dibasic acid anhydrides resulting from the condensation of maleic anhydride and its homologues with dienes such as butadiene, cyclopentadiene, cyclohexadiene, and similar conjugated diolefins. Specifically included in the scope of this invention are maleic anhydride, citraconic anhydride, dimethylmaleic anhydride, ethylmaleic anhydride, itaconic anhydride, methylitaconic anhydride and higher molecular weight unsaturated dibasic acid anhydrides containing up to about 18 carbon atoms obtained by condensation of certain olefins and maleic anhydride itself, notably endomethylenetetrahydrophthalic anhydride and cis-4-cyclohexene-1,2-dicarboxylic acid anhydride. In place of the compounds listed immediately above, maleic anhydride may be employed in admixture with any of the other anhydrides and any other anhydride may be mixed with one or more anhydride other than maleic anhydride.

Substances which may be used to copolymerize with the unsaturated dibasic acid anhydride include the carbonate esters of unsaturated alcohols, viz., allyl alcohol, methallyl alcohol; the biscarbonate esters of dihydroxy compounds such as:

ethylene glycol, bis(allyl carbonate),
diethylene glycol bis(allyl carbonate),
triethylene glycol bis(allyl carbonate),
tetraethylene glyco bis(allyl carbonate),
ethylene glycol bis(methallyl carbonate),
diethylene glycol bis(methallyl carbonate),
bis($\beta$-allyloxyethyl) carbonate,
allyl $\beta$-allyloxyethyl carbonate,
propylene glycol bis(allyl carbonate),
dipropylene glycol bis(methallyl carbonate),
2,2-bis-4-oxycarballyloxyphenylpropane,
1,4-dioxycarballyloxybenzene and mixtures of these and similar compounds. Polyfunctional compounds which may be employed in copolymerization with the unsaturated dibasic acid anhydrides include allyl carbonate esters of polyhydroxylic compounds such as glycerol and pentaerythritol, e.g., glycerol tris(allyl carbonate). In general, compounds may be employed which contain two carballyloxy groups, although it is preferred that these be attached to a bivalent radical, through oxygen links, viz., propylene bis(allyl carbonate).

Compounds of mixed types may also be employed in the present invention, such as carbonates derived from glycols containing atoms of sulfur and nitrogen in place of an oxygen linkage, viz., bis($\beta$-hydroxy ethyl)sulfide. Further combinations utilize the carbamate linkage in polymers derived from ethylene N,N'-bis(allyl carbamate) and especially mixtures of this monomer and similar monomers with biscarbonate monomers.

While in general more than 10 percent of unsaturated dibasic acid anhydride may be employed in the practice of this invention, the moisture sensitivity of the certain contemplated resins may be adversely influenced with quantities of unsaturated dibasic acid anhydride much above 10 percent. That is, the surface of the resin tends to check and become opaque as the concentration of unsaturated dibasic acid anhydride approaches 20 percent. On the other hand, when the quantity of unsaturated dibasic acid anhydride is reduced below 10 percent by weight, the antistatic properties tend to be reduced. For some resin combinations, however, from 1 to 7 percent by weight of unsaturated dibasic acid anhydride may be employed to prevent electrostatic build-up. Under conditions of extremely low humidity, protection from electrostatic accumulation is more effectively achieved by the use of higher amounts of unsaturated dibasic acid anhydride.

Protection from electrostatic build-up is achieved by contacting the resins in boiling aqueous solutions of organic base, notably dimethylaminoethanol. Attack on the resin surface is more rapid with organic base than with water alone, and for this reason the organic base treatment is preferred. Bases which may be employed with satisfactory results include:

ethanolamine, diethanolamine, triethanolamine,
methylaminoethanol, dimethylaminoethanol,
propylaminoethanol, methyldiethanolamine,
ethyldiethanolamine, monoethylaminoethyl ethyl ether,
methylamine, dimethylamine, trimethylamine, ethylamine,
diethylamine, triethylamine, propylamine,
di-n-propylamine, tri-n-propylamine, isopropylamine,
diisopropylamine, triisopropylamine, butylamine,
pyridine, quinoline, piperidine, piperazine, $\alpha$-picoline,
$\beta$-picoline, $\gamma$-picoline, ethylenediamine,
diethylenetriamine, tetramethylaminoethylene.

In addition, mixtures of bases may be employed.

Inorganic bases may be employed to convert the maleic anhydride groups on the surface of the resin articles into electrically conducting groups. In particular alkali metal hydroxides, such as sodium hydroxide in aqueous solution may be employed, but such bases are in general not preferred for most applications because of a tendency to produce a cloudy surface on the treated resin article. Thus, it is preferred to employ organic bases in aqueous solution.

The concentration of organic base may vary from approximately 1 percent to the solubility limit of the particular amine in water. It is preferred to use from 15 to 25 percent solutions by weight in order to produce the desired degree of surface modification in approximately 15 minutes. Thus, an aqueous solution containing 1 percent by weight of an amine may be used in the treatment but at the expense of prolonging the time beyond 15 minutes to approach the time required when water alone is used. That is, 2.5 hours is required in water or very dilute base solutions to produce sufficient surface modification to render the resin antistatic.

Temperatures for treatment of the resin depend on the nature of the aqueous media employed. When the resin is contacted with water, 2.5 hours are required to produce sufficient attack on the resin surface to render it antistatic at 100° C. Hot water at 80° C. requires many hours, hence higher temperatures are preferred. By performing the treatment under pressure temperatures above 100° C. may be obtained and result in corresponding reduction in the time of treatment required. Prolonged exposure at higher temperatures, however, have the disadvantage of causing heat distortion of certain resins. Hence, temperatures below 120° C. are preferred with hot aqueous media containing basic substances, and the time of treatment is shortened. Thus, sufficient antistatic character may be imparted to the resin surface in a shorter period of time or at a lower temperature when a basic substance is contained in the aqueous media. Employing dimethylaminoethanol as a 25 percent by weight hot aqueous media the treatment is completed in 15 minutes, as previously indicated.

The invention herein described may be employed for imparting antistatic properties to any copolymer which contains active acid groups which will react with basic compounds. It is advantageously employed in a surface treatment of the polymer which at the time of treatment may be in the form of molded articles, extruded articles, woven articles, pellets, resin powder before molding to minimize static effects in mold filling, fibers, cast resin articles and the like. The herein described invention further may be employed for imparting antistatic properties to rods, sheets, tubes, geometrically regular shaped articles, such as lenses and irregularly shaped articles of numerous thermosetting resin combinations.

While the invention has been described with reference to the details of certain specific embodiments, it is not intended that the invention be limited thereto except insofar as indicated by the appended claims.

What is claimed is:

1. A method of imparting antistatic properties to the surface of a cast copolymer of a bisallyl carbonate with unsaturated dibasic acid anhydride, said copolymer containing 1 to 20 percent by weight of the copolymer of the anhydride which comprises contacting the surface of the copolymer with aqueous media above 80° C. for at least 15 minutes and until anhydride groups on said surface are converted to electrically conducting groups, said aqueous media being selected from the group consisting of water and aqueous solutions of basic organic amines, removing said aqueous media from said surface and obtaining a resinous product with reduced tendency on the surface thereof to accumulate electrostatic charge.

2. The method of claim 1 wherein the aqueous media is an aqueous solution containing 1 to 25 percent by weight of a water soluble organic amine.

3. The method of claim 2 wherein the bisallyl carbonate is diethylene glycol bisallyl carbonate.

4. The method of claim 2 wherein the bisallyl carbonate is ethylene glycol bisallyl carbonate.

5. The method of claim 2 wherein the water soluble organic amine is dimethylaminoethanol.

References Cited by the Examiner

UNITED STATES PATENTS

| | | | |
|---|---|---|---|
| 2,197,930 | 4/1940 | Jackson et al. | 117—139.50 |
| 2,263,007 | 11/1941 | McNally et al. | 117—139.50 |
| 2,313,565 | 3/1943 | McDowell | 260—78.5 |
| 2,479,522 | 8/1949 | Strain | 260—77.5 |
| 2,565,147 | 8/1951 | Pfluger | 260—78.5 |
| 2,634,256 | 4/1953 | Sparks | 260—78.4 |

RICHARD D. NEVIUS, *Primary Examiner.*

WILLIAM H. SHORT, M. C. JACOBS, A. GOLIAN,
*Assistant Examiners.*